Figure 1:
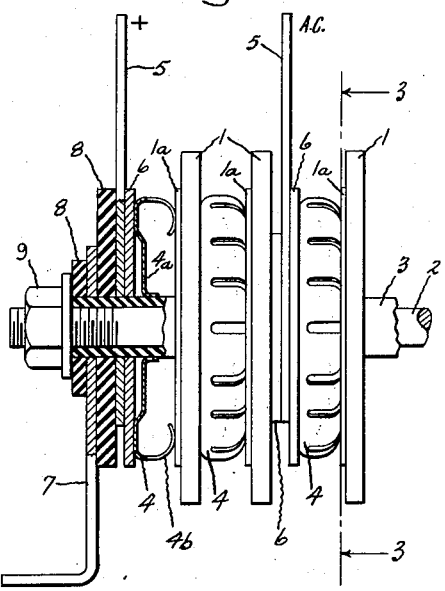

June 28, 1955  B. R. BACON  2,712,102
DRY PLATE RECTIFIER ASSEMBLY AND CONTACT SPRING THEREFOR
Filed June 27, 1950

Inventor:
Bernard R. Bacon,
by  Claude H. Mott
His Attorney.

United States Patent Office 2,712,102
Patented June 28, 1955

2,712,102

DRY PLATE RECTIFIER ASSEMBLY AND CONTACT SPRING THEREFOR

Bernard R. Bacon, North Wilmington, Mass., assignor to General Electric Company, a corporation of New York Application June 27, 1950, Serial No. 170,512

16 Claims. (Cl. 317—234)

My invention relates to dry plate rectifier assemblies, and more particularly to contact springs for interposition between adjacent faces of a plurality of individual dry plate rectifier cells stacked together flatwise in parallel spaced relation to form a complete assembly.

Accordingly, it is a general object of my invention to provide a new and improved rectifier assembly of the stacked dry plate rectifier type.

It is a further object of my invention to provide a new and improved rectifier assembly of the foregoing type which shall be simple and inexpensive to assemble without sacrifice of efficiency or durability.

It is still another object of my invention to provide a new and improved, as well as a simplified and inexpensive, contact member for interposition between adjacent faces of dry plate rectifier cells stacked flatwise in parallel spaced relation.

It is a more particular object of my invention to provide a new and improved unitary contact and spacing member for assembly between dry plate rectifier members which shall be simple and inexpensive to assemble and shall be so shaped that it shall not be subject to entanglement with similar contact members when stored loosely in bins or the like.

In carrying out my invention in one form, a plurality of dry plate rectifier cells are spaced from one another and electrically connected together by contact members having a substantially tubular resilient portion interposed between the cell plates or between a cell plate and a terminal connection of the rectifier assembly in which the cell plates and contact members are held together under pressure by an insulated support rod which passes through the cell plates and the contact members. Each of the contact members has an opening in its base or web portion for receiving the support rod, a downwardly extending or embossed portion disposed on the base about this opening in spaced relation thereto for contact with one adjacent rectifier cell plate, and a series of upwardly extending resilient arms or legs disposed about the periphery of the base and turned inwardly toward one another over the base for making a resilient contact with the other adjacent rectifier cell plate. The downwardly embossed portions of the contact member have relatively broad flat lower surfaces to provide low contact pressure against said one adjacent cell plate, and the resilient arms or legs which are curled at their ends over the base are flexed downwardly when the rectifier cell plates are forced together during assembly so that they are maintained under compression to provide good electrical contact between the cell plates and the interposed contact member which acts as a cell plate spacer.

Figure 2:
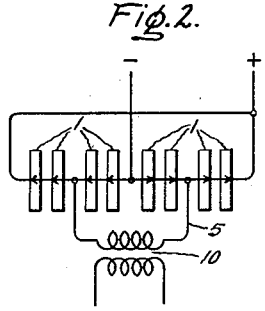
Figure 3:
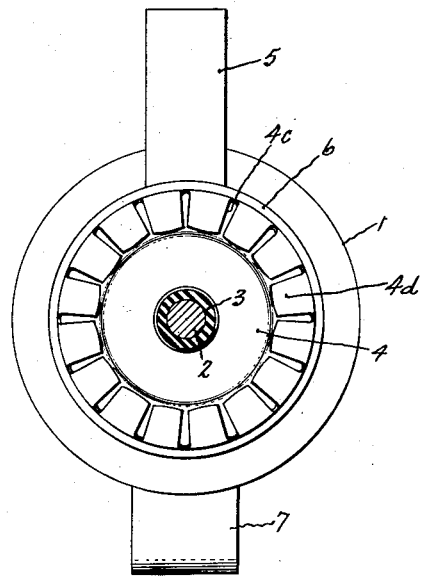

My invention itself will be more fully understood and its various objects and advantages further appreciated by referring now to the following detailed specification taken in conjunction with the accompanying drawing, in which Fig. 1 is a fragmentary side elevational view, partly in cross-section, of a rectifier assembly, or stack, embodying my invention; Fig. 2 is a schematic circuit diagram of a complete rectifier assembly such as that shown at Fig. 1, showing circuit input and output connections; and Fig. 3 is a transverse cross-sectional view of the rectifier assembly shown at Fig. 1 taken along the line 3—3 looking in the direction of the arrows.

Referring now to the drawing, and particularly to Fig. 1, I have there illustrated in fragmentary form a rectifier assembly comprising a plurality of dry plate rectifier cells, or discs, 1 mounted flatwise in parallel spaced relation upon a mounting bolt 2, the cells being axially spaced apart along the bolt. While my invention is applicable to other types of dry plate rectifier cells, I have illustrated the cells 1 as being of the selenium type and including a base plate coated with a layer of selenium and a counter-electrode 1a overlying the selenium layer. To prevent short-circuiting the cells, the mounting bolt 2 is provided with an insulating sleeve 3. Each cell is centrally apertured, and the cells are mounted upon the insulating sleeve 3, the bolt 2 and sleeve 3 passing through the central apertures. The cells are electrically interconnected and connected to certain terminal members 5 by resilient contact members 4 which are interposed between adjacent faces of similarly disposed pairs of rectifier cells and between certain of the cells and the terminal members. These contact members 4 will be more fully described hereinafter. The entire assembly is electrically divided into sections by means of apertured terminal plates or connectors 5 mounted upon the bolt 2, the cells within any one section being similarly disposed and connected in series circuit relation by the contact members 4. Between each terminal connector 5 and an adjacent cell 1 or contact member 4, I provide a spacing washer 6 of copper or other electric conducting material. The mounting bolt 2 is provided at each end with a mounting bracket 7 having an aperture through which the bolt and insulating sleeve 3 pass. Each mounting bracket 7 is electrically insulated from the bolt and the adjacent terminal connector 5 by means of a pair of insulating end washers 8 disposed on opposite sides of the mounting bracket. The entire assembly is clamped together and held in assembled relation under pressure by means of a nut 9 on the end of the bolt.

It will be understood that for simplicity of illustration I have only shown a portion of an entire rectifier assembly. Thus, the opposite end of the bolt 2 is provided also with an end terminal 5, a mounting bracket 7 and insulating washers 8, these elements being assembled in the same manner at each end of the bolt. It will also be understood that the intermediate rectifier cells 1 and the intermediate terminal connectors 5 may be assembled in various manners to form rectifier assemblies of various well known types. The rectifier assembly shown at Fig. 1 is a part of a full wave bridge type rectifier stack. Such a full wave bridge type rectifier stack is shown schematically at Fig. 2. It will be evident from the Fig. 2 that the entire stack is divided into four sections, each including two similarly disposed and serially connected rectifier cells. The end terminals are connected together to constitute one direct current terminal, and the central terminal constitutes the other direct current terminal. Alternating current is applied, as through a transformer 10 to a pair of terminal connectors 5 disposed midway between the direct current terminal connectors.

The contact members or springs 4 which are disposed between similarly disposed pairs of serially connected cells 1 and between certain of the cells and the terminal connectors 5 are resilient in a direction axial of the bolt 2, in order to provide for maintenance of good electrical connection under operating conditions when the bolt 2 expands due to heat. For this purpose each contact member 4 is formed as a centrally apertured circular plate or disc having a central web portion 4a and a peripheral contact portion 4b rolled or turned over to form a ring-shaped tubular portion of substantially toroidal configuration. The rolled-over or substantially tubular peripheral edge portion 4b of each contact member 4 is transversely slotted at a number of points, as at 4c (Fig. 3). In the circular toroidal form illustrated these slots are disposed radially of the web 4a. This slotted construction results in the tubular or toroidal peripheral contact portion being formed of a number of turned over resilient contact arms or legs 4d (Fig. 3). Each of these members, and consequently the entire rolled or tubular edge portion is resilient transversely of the contact member or plate 4, and thus axially of the bolt 2 when the contact members are in stacked position between the rectifier cells.

It will now be understood by those skilled in the art that I have provided a new and improved resilient contact member for interposition between each pair of a plurality of dry plate rectifier cells stacked in parallel spaced apart relation. This improved contact member is formed as a single unitary piece and serves both to space the cells apart and electrically connect them together. Moreover the contact member is transversely resilient to provide for expansion and contraction of the mounting bolt due to heat generated in operation of the rectifier. Contact members embodying my invention have the further advantage that they do not provide any sharp corners in contact with the cell surfaces, so that they are not likely to damage the surfaces of the cells when they slide on the cell due to expansion and contraction of the mounting bolt. It will be evident to those skilled in the art that it is not necessary to the practice of my invention that the contact members be of circular configuration, but that the ring-shaped tubular peripheral contact portion may be non-circular and the "ring" either closed or open at one side. Moreover, the "tubular" cross-sectional configuration of the contact portion may be either circular or non-circular, and is preferably open at one side, i. e. split longitudinally. Contact members embodying my invention are of such configuration that they do not tend to become mutually entangled when stored loosely in bins.

Thus, while I have described a preferred embodiment of my invention by way of illustration, many modifications will occur to those skilled in the art, and I, therefore, wish to have it understood that I intend in the appended claims to cover all such modifications as fall within the true spirit and scope of my invention.

What I claim as new and desire to secure by Letters Patent of the United States is:

1. A rectifier assembly comprising a plurality of dry plate rectifier cells, means mounting said cells in flatwise parallel spaced relation, an electric contact member having a substantially tubular resilient portion interposed between adjacent faces of similarly disposed pairs of said cells, and clamping means holding said contact members and cells in assembled relation.

2. A rectifier assembly comprising a plurality of dry plate rectifier cells, means mounting said cells in flatwise parallel spaced relation, an electric contact member having a substantially ring-shaped contact portion of substantially tubular cross-sectional configuration interposed between adjacent faces of similarly disposed pairs of said cells, said contact portions of said contact members being transversely resilient, and clamping means holding said contact members in engaging relation with said adjacent faces.

3. A rectifier assembly comprising a plurality of dry plate rectifier cells, means mounting said cells in flatwise parallel spaced relation, an electric contact member having a resilient rolled peripheral edge interposed between adjacent faces of similarly disposed pairs of said cells, and clamping means holding said contact members in engaging relation with said adjacent faces.

4. A rectifier assembly comprising a plurality of dry plate rectifier cells, means mounting said cells in flatwise parallel spaced relation, an electric contact plate having a rolled and transversely slotted peripheral edge portion interposed between adjacent faces of similarly disposed pairs of said cells, and clamping means holding said contact members in engaging relation with said adjacent faces.

5. A rectifier assembly comprising a plurality of dry plate rectifier cells, means mounting said cells in flatwise parallel spaced relation, an electric contact disc having an open rolled and radially slotted peripheral edge portion interposed between adjacent faces of similarly disposed pairs of said cells, said rolled edge portion being transversely resilient, and clamping means holding said contact members in engaging relation with said adjacent faces.

6. A rectifier assembly comprising a plurality of dry plate rectifier cells, means mounting said cells in flatwise parallel spaced relation, an electric contact member having a transversely resilient and substantially toroidal contact portion interposed between adjacent faces of similarly disposed pairs of said cells, and clamping means holding said contact members in engaging relation with said adjacent faces.

7. A rectifier assembly comprising a plurality of dry plate rectifier cells, means mounting said cells in flatwise parallel spaced relation, a resilient electric contact member having a radially slotted and substantially toroidal peripheral edge portion interposed between adjacent faces of similarly disposed pairs of said cells, said edge portion being transversely resilient, and clamping means holding said contact members in engaging relation with said adjacent faces.

8. A rectifier assembly comprising a mounting bolt, a plurality of centrally apertured dry plate rectifier cells mounted upon said bolt in flatwise parallel spaced relation, a centrally apertured contact plate having a transversely resilient rolled peripheral edge portion interposed between adjacent faces of similarly disposed pairs of said cells, and clamping means holding said contact plates in engaging relation with said adjacent faces.

9. A rectifier assembly comprising a mounting bolt, a plurality of centrally apertured dry plate rectifier cells mounted upon said bolt in flatwise parallel spaced relation, a centrally apertured contact disc having a radially slotted and substantially toroidal peripheral edge portion interposed between adjacent faces of similarly disposed pairs of said cells, said toroidal edge portion being transversely resilient, and clamping means holding said contact plates in engaging relation with said adjacent faces.

10. A contact member for interposition between adjacent faces of a pair of dry plate rectifier cells mounted in parallel spaced relation comprising a web portion and a transversely resilient substantially tubular peripheral contact portion.

11. A contact member for interposition between adjacent faces of a pair of dry plate rectifier cells mounted in parallel spaced relation comprising a web portion and a tubularly rolled radially slotted peripheral contact portion.

12. A contact disc for interposition between adjacent faces of a pair of dry plate rectifier cells mounted in parallel spaced relation comprising a central web portion and a hollow substantially toroidal peripheral portion slotted radially of said web portion.

13. A contact member for interposition between adjacent faces of a pair of dry plate rectifier cells mounted in parallel spaced relation comprising a central web portion and a peripheral contact portion formed of a plurality of resilient arms turned inwardly toward one another and over said web portion about which they are positioned in side by side relation.

14. A rectifier assembly comprising a plurality of dry plate rectifier cells, means mounting said cells in flatwise parallel spaced relation, an electric contact member interposed between adjacent faces of similarly disposed pairs of said cells, each said contact member having a central web portion and a peripheral contact portion formed of a plurality of resilient arms turned inwardly toward one another and over said web portion about which they are positioned in side by side relation, and clamping means holding said contact members and cells in assembled relation under pressure.

15. A rectifier assembly, comprising a plurality of stacked rectifier plates having aligned openings therein; a center insulating support rod disposed through openings in the plates; a plate spacer disposed between pairs of adjacent plates, said spacer comprising a base having an opening therein for receiving the center support rod, downwardly embossed portions disposed on the base about the opening in spaced relation thereto for contact with one adjacent rectifier plate, said downwardly embossed portions having relatively broad flat lower surfaces to provide low contact pressure against said one adjacent plate, and a series of upwardly extending arms disposed on the base for contact with the other adjacent rectifier plate, said arms being curled inwardly and being shaped and arranged to be flexed downwardly when the plates are forced together during assembly whereby the arms may be maintained under compression to provide good electrical contact between the plates and the spacer; and means on the support rod beyond each outermost plate for retaining the plates compressed together on the rod.

16. A sheet metal rectifier plate spacer comprising a base adapted for electrical contact with a lower rectifier plate, said base having an opening therein to receive an insulating support rod, and a series of upwardly extending resilient legs disposed on the base about the opening for contact with an upper rectifier plate, said legs being curled over at their ends opposite the base and shaped and arranged to be flexed downwardly when the rectifier plates are forced together during assembly, whereby the resilient legs may be maintained under tension to insure good electrical contact between the spacer and the plates.

References Cited in the file of this patent

UNITED STATES PATENTS

| | | |
|---|---|---|
| 1,801,836 | Aumann | Apr. 21, 1931 |
| 2,114,898 | Dormay | Apr. 19, 1938 |
| 2,328,488 | Peters | Aug. 31, 1943 |
| 2,414,801 | Clarke | Jan. 28, 1947 |
| 2,445,769 | Fiore | July 27, 1948 |
| 2,473,419 | Fletcher et al. | June 14, 1949 |
| 2,640,871 | Carbary | June 2, 1953 |